US012572362B2

(12) United States Patent
Jiao et al.

(10) Patent No.: US 12,572,362 B2
(45) Date of Patent: Mar. 10, 2026

(54) PROCESSOR AND METHOD FOR EXECUTING A LOOPING CODE SEGMENT WITH ZERO OVERHEAD

(71) Applicant: STMicroelectronics International N.V., Geneva (CH)

(72) Inventors: Xiao Kang Jiao, Beijing (CN); Fabio Giuseppe De Ambroggi, Biassono (IT)

(73) Assignee: STMicroelectronics International N.V., Geneva (CH)

( * ) Notice: Subject to any disclaimer, the term of this patent is extended or adjusted under 35 U.S.C. 154(b) by 20 days.

(21) Appl. No.: 18/655,929

(22) Filed: May 6, 2024

(65) Prior Publication Data

US 2025/0342039 A1 Nov. 6, 2025

(51) Int. Cl.
G06F 9/38 (2018.01)
G06F 9/32 (2018.01)

(52) U.S. Cl.
CPC .......... G06F 9/3808 (2013.01); G06F 9/3806 (2013.01); G06F 9/325 (2013.01)

(58) Field of Classification Search
CPC ...... G06F 9/3808; G06F 9/3806; G06F 9/381; G06F 9/325
See application file for complete search history.

(56) References Cited

U.S. PATENT DOCUMENTS 11,194,763 B1 12/2021 Grider
2005/0268040 A1 12/2005 Lee

2009/0150658 A1* 6/2009 Mizumo ................. G06F 9/325
712/241
2009/0217017 A1* 8/2009 Alexander ............ G06F 9/3814
712/241
2010/0049958 A1* 2/2010 Vaskevich ............... G06F 9/325
712/241
2012/0124344 A1* 5/2012 Jarvis ...................... G06F 9/325
712/230
2015/0309795 A1* 10/2015 Kurd ..................... G06F 9/3836
712/241
2022/0100514 A1 3/2022 Nori et al.
2022/0197660 A1 6/2022 Sun et al.
2023/0108825 A1 4/2023 Grocutt et al.
2023/0130323 A1 4/2023 Chavan

* cited by examiner

*Primary Examiner* — Courtney P Spann
(74) *Attorney, Agent, or Firm* — Alston & Bird LLP

(57) ABSTRACT

Example processors and methods for executing a looping code segment with zero overhead are provided. An example processor includes a pipelined architecture configured to execute a looping code segment having a first loop instruction at a first loop instruction address, a last loop instruction at a last loop instruction address, and a loop branch instruction. The processor includes a branch target address predictor, having a branch identifier, first instruction operational codes associated with the first loop instruction, a second loop instruction address in sequence with the first loop instruction address, and a branch taken indicator indicating a likelihood that the loop branch instruction directs execution to the first loop instruction. The branch target address predictor enables the pipelined architecture to execute the looping code segment with zero overhead, meaning the last loop instruction and the first loop instruction are executed on consecutive cycles.

20 Claims, 10 Drawing Sheets

330

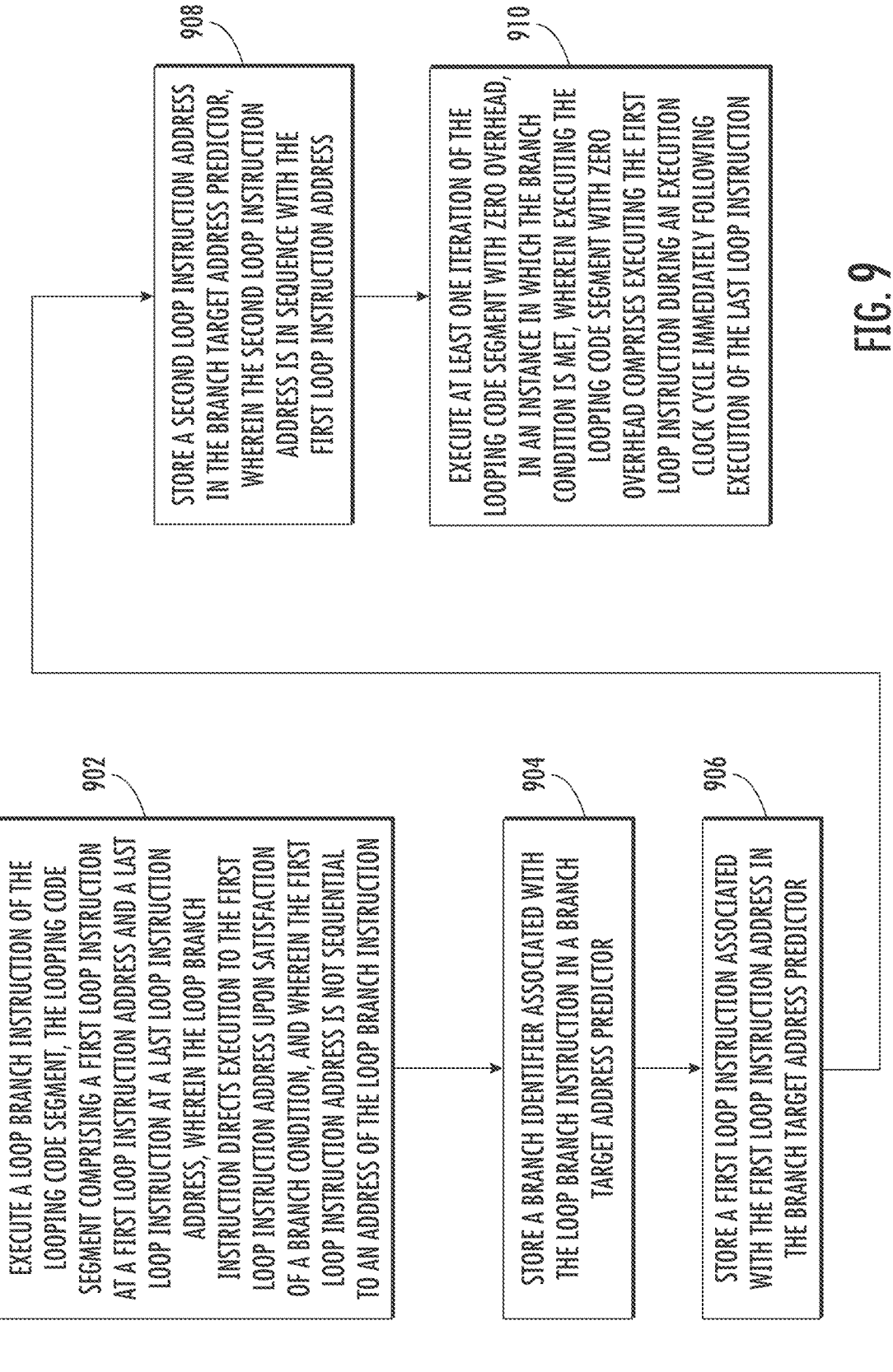

EXECUTE A LOOP BRANCH INSTRUCTION OF THE LOOPING CODE SEGMENT, THE LOOPING CODE SEGMENT COMPRISING A FIRST LOOP INSTRUCTION AT A FIRST LOOP INSTRUCTION ADDRESS AND A LAST LOOP INSTRUCTION AT A LAST LOOP INSTRUCTION ADDRESS, WHEREIN THE LOOP BRANCH INSTRUCTION DIRECTS EXECUTION TO THE FIRST LOOP INSTRUCTION ADDRESS UPON SATISFACTION OF A BRANCH CONDITION, AND WHEREIN THE FIRST LOOP INSTRUCTION ADDRESS IS NOT SEQUENTIAL TO AN ADDRESS OF THE LOOP BRANCH INSTRUCTION

904

STORE A BRANCH IDENTIFIER ASSOCIATED WITH THE LOOP BRANCH INSTRUCTION IN A BRANCH TARGET ADDRESS PREDICTOR

906

STORE A FIRST LOOP INSTRUCTION ASSOCIATED WITH THE FIRST LOOP INSTRUCTION ADDRESS IN THE BRANCH TARGET ADDRESS PREDICTOR

908

STORE A SECOND LOOP INSTRUCTION ADDRESS IN THE BRANCH TARGET ADDRESS PREDICTOR, WHEREIN THE SECOND LOOP INSTRUCTION ADDRESS IS IN SEQUENCE WITH THE FIRST LOOP INSTRUCTION ADDRESS

910

EXECUTE AT LEAST ONE ITERATION OF THE LOOPING CODE SEGMENT WITH ZERO OVERHEAD, IN AN INSTANCE IN WHICH THE BRANCH CONDITION IS MET, WHEREIN EXECUTING THE LOOPING CODE SEGMENT WITH ZERO OVERHEAD COMPRISES EXECUTING THE FIRST LOOP INSTRUCTION DURING AN EXECUTION CLOCK CYCLE IMMEDIATELY FOLLOWING EXECUTION OF THE LAST LOOP INSTRUCTION

1000

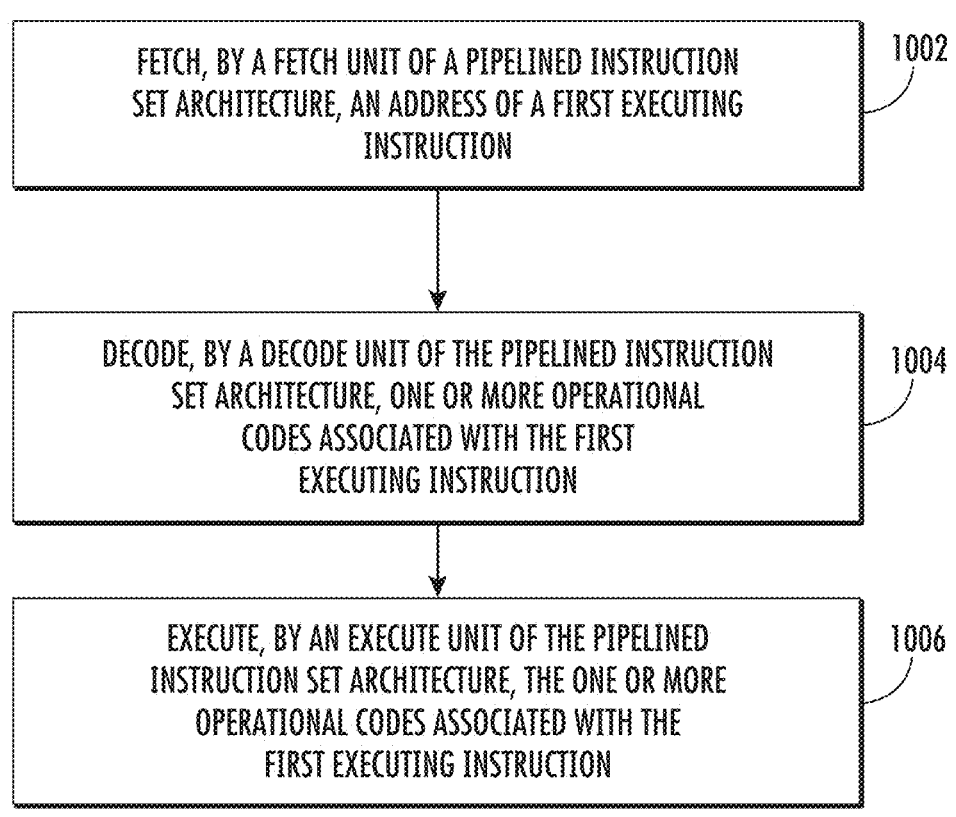

FETCH, BY A FETCH UNIT OF A PIPELINED INSTRUCTION
SET ARCHITECTURE, AN ADDRESS OF A FIRST EXECUTING
INSTRUCTION          1002

DECODE, BY A DECODE UNIT OF THE PIPELINED INSTRUCTION
SET ARCHITECTURE, ONE OR MORE OPERATIONAL
CODES ASSOCIATED WITH THE FIRST
EXECUTING INSTRUCTION          1004

EXECUTE, BY AN EXECUTE UNIT OF THE PIPELINED
INSTRUCTION SET ARCHITECTURE, THE ONE OR MORE
OPERATIONAL CODES ASSOCIATED WITH THE
FIRST EXECUTING INSTRUCTION          1006

FIG. 10

PROCESSOR AND METHOD FOR EXECUTING A LOOPING CODE SEGMENT WITH ZERO OVERHEAD

TECHNOLOGICAL FIELD

Embodiments of the present disclosure relate generally to utilizing a pipelined architecture to execute a looping code segment on a processor with zero overhead, and more specifically to leveraging a branch target address predictor to execute the looping code segment with zero overhead.

BACKGROUND

Looping code segments are common constructs of programmed code. Executing looping code segments requires a computer processor to re-execute a portion of code while a certain condition is met. At the instruction set level, a looping code segment is generally implemented with a branch instruction. A branch instruction directs execution of a computer program to a non-sequential position. For example, a branch instruction may be placed at the bottom of a looping code segment and direct execution back to the top of the looping code segment (e.g., the start of the loop).

Applicant has identified many technical challenges and difficulties associated with efficiently executing looping code segments. Through applied effort, ingenuity, and innovation, Applicant has solved problems related to the execution of looping code segments by developing solutions embodied in the present disclosure, which are described in detail below.

BRIEF SUMMARY

Various embodiments are directed to an example processor and method for executing a looping code segment with zero overhead. An example processor may comprise, a pipelined architecture configured to execute one or more instructions on an execute clock cycle. The processor may further include a looping code segment comprising a first loop instruction at a first loop instruction address, a last loop instruction at a last loop instruction address, and a loop branch instruction. The processor may further comprise a branch target address predictor, comprising a branch identifier configured to identify the loop branch instruction, one or more first instruction operational codes associated with the first loop instruction, a second loop instruction address wherein the second loop instruction address is in sequence with the first loop instruction address, and a branch taken indicator indicating a likelihood that the loop branch instruction directs execution to the first loop instruction. The branch target address predictor enables the pipelined architecture to execute the last loop instruction and the first loop instruction on consecutive execute clock cycles.

In some embodiments, the branch target address predictor further comprises a valid branch identifier, indicating the branch identifier is initialized.

In some embodiments, the branch target address predictor further comprises a valid opcode identifier, indicating the one or more first instruction operational codes associated with the first loop instruction are initialized.

In some embodiments, the processor further comprises a branch target address cache, the branch target address cache comprising one or more branch target address predictors.

In some embodiments, the loop branch instruction associated with the branch identifier is executed as part of the looping code segment, wherein the loop branch instruction is executed last in the looping code segment.

In some embodiments, a branch target address predictor is stored in the branch target address cache after a first execution of the loop branch instruction, and the branch identifier of the branch target address predictor is associated with an instruction address of the loop branch instruction.

In some embodiments, the valid branch identifier is updated to indicate the branch identifier is initialized.

In some embodiments, the second loop instruction address is stored in the branch target address predictor after a second execution of the loop branch instruction.

In some embodiments, the valid opcode identifier is updated to indicate the second loop instruction address is initialized.

In some embodiments, the pipelined architecture further comprises a fetch unit, a decode unit, and an execute unit. The fetch unit configured to identify an address of a first executing instruction. The decode unit, configured to determine one or more operational codes associated with the first executing instruction. The execute unit configured to execute the one or more operational codes associated with the first executing instruction.

In some embodiments, first executing instruction in the pipelined architecture comprises the loop branch instruction and the one or more first instruction operational codes.

An example method for executing a looping code segment is further provided. in some embodiments, the method comprises executing a loop branch instruction of the looping code segment, the looping code segment comprising a first loop instruction at a first loop instruction address and a last loop instruction at a last loop instruction address, wherein the loop branch instruction directs execution to the first loop instruction address upon satisfaction of a branch condition, and wherein the first loop instruction address is not sequential to an address of the loop branch instruction. The example method further comprises storing a branch identifier associated with the loop branch instruction in a branch target address predictor, storing a first loop instruction associated with the first loop instruction address in the branch target address predictor, and storing a second loop instruction address in the branch target address predictor, wherein the second loop instruction address is in sequence with the first loop instruction address. The example method further comprises executing at least one iteration of the looping code segment with zero overhead in an instance in which the branch condition is met. Executing the looping code segment with zero overhead comprises executing the first loop instruction during an execution clock cycle immediately following execution of the last loop instruction.

In some embodiments, the method further comprises storing a valid branch identifier, indicating the branch identifier is initialized.

In some embodiments, the method further comprises storing a valid opcode identifier, indicating the second loop instruction address is initialized.

In some embodiments, the method further comprises storing one or more branch target address predictors in a branch target address cache.

In some embodiments, the method further comprise fetching, by a fetch unit of a pipelined architecture, an address of a first executing instruction; decoding, by a decode unit of the pipelined architecture, one or more operational codes associated with the first executing instruction; and executing, by an execute unit of the pipelined architecture, the one or more operational codes associated with the first executing instruction.

In some embodiments, first executing instruction in the pipelined architecture comprises the loop branch instruction and the one or more first instruction operational codes.

Another example processor is further provided. The example processor comprising a pipelined architecture configured to execute one or more instructions on an execute clock cycle. The processor further comprising a looping code segment comprising a first loop instruction at a first loop instruction address, a second loop instruction at a second loop instruction address, a last loop instruction at a last loop instruction address, and a loop branch instruction. The processor further comprising a branch target address predictor, comprising: a first memory portion configured to store a valid branch identifier, indicating a branch identifier is initialized; a second memory portion configured to store a branch taken indicator indicating a likelihood that the loop branch instruction directs execution to the first loop instruction; a third memory portion configured to store a branch identifier; a fourth memory portion configured to store a variable target address instruction; a fifth memory portion configured to store one or more first instruction operational codes associated with the first loop instruction; and a sixth memory portion configured to store a valid opcode identifier, indicating the one or more first instruction operational codes stored in the fifth memory portion are initialized. In some embodiments, the fourth memory portion stores the first loop instruction address after a first iteration of the looping code segment, and the second loop instruction address after two or more iterations of the looping code segment.

In some embodiments, the branch target address predictor enables the pipelined architecture to execute the last loop instruction and the first loop instruction on consecutive execute clock cycles.

In some embodiments, the pipelined architecture further comprises a fetch unit, configured to identify an address of a first executing instruction; a decode unit, configured to determine one or more operational codes associated with the first executing instruction; and an execute unit, configured to execute the one or more operational codes associated with the first executing instruction.

In some embodiments, the first executing instruction in the pipelined architecture comprises the loop branch instruction and the first loop instruction.

BRIEF DESCRIPTION OF THE DRAWINGS

Reference will now be made to the accompanying drawings. The components illustrated in the figures may or may not be present in certain embodiments described herein. Some embodiments may include fewer (or more) components than those shown in the figures in accordance with an example embodiment of the present disclosure.

FIG. 9 depicts a flow diagram illustrating an example process for executing a looping code segment with zero overhead in accordance with an example embodiment of the present disclosure.

FIG. 10 depicts a flow diagram illustrating an example process for executing instructions in a looping code segment in accordance with an example embodiment of the present disclosure.

DETAILED DESCRIPTION

Figure 1:
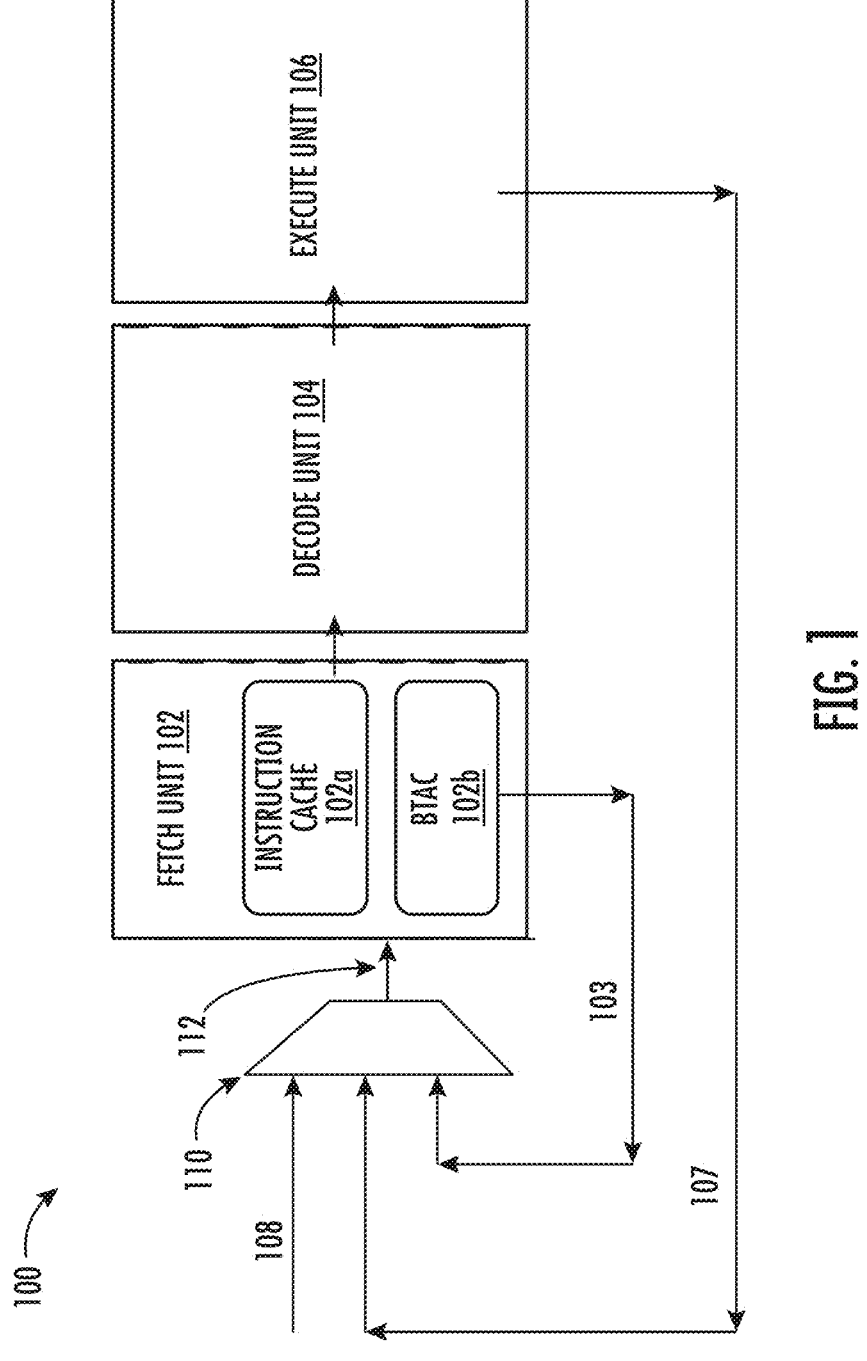
FIG. 1 illustrates an example branch target address predictor in accordance with an example embodiment of the present disclosure.

Example embodiments will be described more fully hereinafter with reference to the accompanying drawings, in which some, but not all embodiments of the inventions of the disclosure are shown. Indeed, embodiments of the disclosure may be embodied in many different forms and should not be construed as limited to the embodiments set forth herein; rather, these embodiments are provided so that this disclosure will satisfy applicable legal requirements. Like numbers refer to like elements throughout.

Various example embodiments address technical problems associated with executing a looping code segment on a processor having a pipelined architecture with zero overhead. As understood by those of skill in the field to which the present disclosure pertains, there are numerous advantages to executing a looping code segment with zero overhead.

Looping code segments are common constructs of programmed code. Executing looping code segments requires a computer processor to re-execute a portion of code while a condition is met. At the instruction set level, a looping code segment is generally implemented with a loop branch instruction. A loop branch instruction directs execution of a computer program to a non-sequential position. For example, a loop branch instruction may be placed at the bottom of a looping code segment and direct execution back to the top of the looping code segment (e.g., the start of the loop).

Zero-overhead looping is a feature of many processors, especially digital signal processors (DSPs). Zero-overhead looping can repeat the body of a loop automatically, without wasting execution cycles to check the condition and jump to the start of the loop. Traditionally, at the instruction set level, a processor executing a loop must increment the instruction counter, check whether the end of the loop has been reached, evaluate the loop condition, jump to the beginning of the looping code segment, and perform any other overhead instructions required to re-execute the looping code segment. The performance of such a sequence of instructions each time the end of the looping code segment is reached may be detrimental to the performance of a processor. Particularly in an instance in which the looping code segment is repeated many times and/or the looping code segment contains few instructions.

Some instruction set architectures (ISAs) may implement a zero-overhead loop using explicit assembly instructions. For example, a widely used instruction is the "DO" instruction. The "DO" instruction utilizes three dedicated hardware registers to record the start-address of the looping code segment, the end address of the looping code segment, and the loop counter associated with the looping code segment. Utilizing the information provided in the "DO" instruction, the control logic of the processor may execute the looping code segment without overhead.

The "DO" instruction, however, is difficult for compilers and software programmers to use. The "DO" instruction is more complex than other instructions in a Reduced Instruction Set Computer (RISC) ISA, making it quite difficult for compilers to generate "DO" instructions automatically. Further, there is no corresponding operation in higher level programming languages (e.g., C) making it difficult for programmers to explicitly utilize the "DO" instruction in the higher-level language. In addition, the "DO" instruction does not support nested or multi-threaded zero-overhead loops without the use of numerous stacked hardware registers. Designing an instruction memory with multiple levels of stacked hardware registers may be difficult and may occupy additional space.

The various example embodiments described herein utilize various techniques to automatically execute looping code segments with zero overhead, without intervention of a software programmer or a compiler. For example, a branch target address cache (BTAC) including BTAC entries may be leveraged to predict whether a loop branch instruction of a looping code segment will be taken, redirecting processing to a first loop instruction. In addition, a BTAC entry may be configured to store one or more operational codes associated with the first loop instruction. By storing the operational codes associated with the first loop instruction, the processor may perform the first loop instruction in the same executing clock cycle as the branch condition is resolved.

Further, a BTAC entry may be configured to store the instruction address of the second loop instruction, sequentially following the first loop instruction. The second loop instruction may be inserted into the fetch unit of the pipelined architecture immediately following the loop branch instruction and first loop instruction operational codes combination. Utilizing the concepts described herein enables the processor to execute the first loop instruction in the execute clock cycle immediately following the execution of the last loop instruction in an instance in which the loop branch instruction redirects execution to the first loop instruction, thus, performing the next iteration of the looping code segment with zero overhead.

As a result of the herein described example embodiments and in some examples, the effectiveness of a processor may be greatly improved. For example, looping code segments may be performed with zero overhead without the need of specialized assembly instructions. In addition, the looping code segments of a computer program may be performed with zero overhead without explicit instructions by a software programmer. Thus, the processor is enabled to perform iterations of a looping code segment with zero overhead automatically, without the intervention of a compiler or a software programmer.

Referring now to FIG. 1, an example pipelined architecture 100 is depicted. As depicted in FIG. 1, the example pipelined architecture 100 includes three units, a fetch unit 102 electrically coupled to a decode unit 104, which is electrically coupled to an execute unit 106. The fetch unit 102 includes an instruction cache 102*a* and a branch target address cache (BTAC) 102*b*. The fetch unit 102 is further configured to provide a predicted branch target address 103 to an electrically coupled instruction input multiplexer 110. The instruction input mux 110 is further configured to receive a resolved branch target address 107 and a sequential instruction target address 108 and generate an instruction target address 112 for the electrically coupled fetch unit 102.

As depicted in FIG. 1, the example pipelined architecture 100 includes a fetch unit 102 followed by an electrically coupled decode unit 104, followed by an electrically coupled execute unit 106. The functionality of each of the fetch unit 102, the decode unit 104, and the execute unit 106 are performed during one execution clock cycle. A fetch unit 102 is configured to write the memory address of the next instruction to be decoded to the program counter (e.g., instruction pointer, instruction address register, instruction counter, etc.) during an execution clock cycle based on a received instruction target address 112. Concurrently, a decode unit 104 is configured to determine one or more commands based on the instruction opcode contained at the memory address indicated by the program counter. Also concurrently, the execute unit 106 is configured to execute the one or more commands indicated by the instruction opcode.

In addition, the fetch unit 102 of the example pipelined architecture 100 includes a BTAC 102*b*. The BTAC 102*b* is any memory device configured to store one or more BTAC entries containing data constructs to identify a loop branch instruction, predict a branch action, and provide an instruction based on the predicted branch action. A BTAC entry is described further in relation to FIG. 2.

A BTAC 102*b* may be configured to store a BTAC entry in the BTAC 102*b* the first time a branch instruction is executed. A branch instruction is any compute instruction that directs execution of program execution to a non-sequential address identified by the branch instruction based on satisfaction of a condition. The BTAC 102*b* may store the non-sequential address identified by the branch instruction along with an identifier of the branch instruction in the BTAC 102*b*. In an instance in which the instruction target address 112 is associated with a branch instruction identified in the BTAC 102*b*, a branch action is predicted. In an instance in which the branch instruction is predicted to be taken (e.g., program execution is directed to a non-sequential instruction identified by the branch instruction), the stored non-sequential address is provided as the predicted branch target address 103. Providing the stored non-sequential address while the branch instruction is in the fetch unit 102 enables the stored non-sequential address to be placed in the pipelined architecture to be quickly executed if the branch is taken. In some embodiments, branch action may be predicted based on historical outcomes of the condition associated with the branch instruction.

In addition, the fetch unit 102 of the example pipelined architecture 100 includes an instruction cache 102*a*. The instruction cache 102*a* may include a temporary memory used to store recently and/or often used instructions. An instruction cache 102*a* may be utilized by a fetch unit 102 to speed up the fetch of instructions indicated by the instruction target address 112.

As further depicted in FIG. 1, the pipelined architecture includes a decode unit 104. The decode unit 104 is configured to interpret the instruction encoded at the instruction address stored in the program counter. The decode unit 104 may generate one or more control signals configured to perform the operation indicated at the instruction address.

As further depicted in FIG. 1, the pipelined architecture 100 includes an execute unit 106. The execute unit 106 performs the instruction decoded by the decode unit 104. For example, the execute unit 106 may read one or more registers, transmit data to one or more arithmetic units, write values to a location or register, and so on.

In addition, the fetch unit 102 depicted in FIG. 1 generates a resolved branch target address 107 in an instance in which a branch instruction is executed by the execute unit 106. The resolved branch target address 107 may be selected by the instruction input mux 110 in an instance in which the branch instruction is taken. In addition, the resolved branch target address 107 may be stored in the BTAC 102*b* at the branch identifier associated with the branch instruction.

As further depicted in FIG. 1, the pipelined architecture 100 includes an instruction input mux 110. An instruction input mux 110 is one or more electrical components configured to select an instruction target address 112 from a plurality of target address. For example, as depicted in FIG. 1, the instruction input mux 110 may be configured to select the instruction target address from the predicted branch target address 103, the resolved branch target address 107, or the stored non-sequential address is provided as the predicted branch target address 103. The stored non-sequential address is provided as the predicted branch target address 103 refers to the address next in sequence from the instruction target address 112 currently provided to the fetch unit 102.

Figure 2:
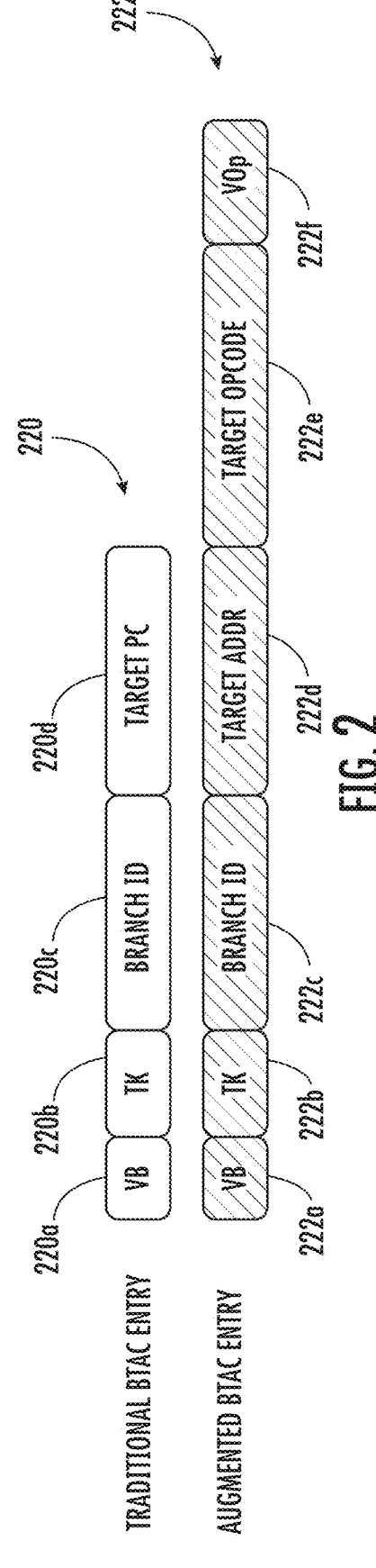
FIG. 2 illustrates a block diagram of an example pipelined architecture including a branch target address cache in accordance with an example embodiment of the present disclosure.

Referring now to FIG. 2, a traditional branch target address cache (BTAC) entry 220 and an example branch target address predictor 222 in accordance with the present disclosure are shown.

As depicted in FIG. 2, the traditional BTAC entry 220 includes a valid branch identifier 220*a*, a branch taken indicator 220*b*, a branch identifier 220*c*, and a target program counter 220*d*. A traditional BTAC entry 220 is stored in a BTAC (e.g., BTAC 102*b*) in an instance in which a branch instruction is first encountered. Once the branch instruction is resolved at an execute unit (e.g., execute unit 106) of a pipelined architecture (e.g., pipelined architecture 100), the resolved branch target address (e.g., resolved branch target address 107) may be provided to the fetch unit (e.g., fetch unit 102) of the pipelined architecture. The fetch unit may create a traditional BTAC entry 220 to be stored in the BTAC electrically coupled to the fetch unit.

The traditional BTAC entry 220 comprises data identifying a branch instruction and predicting the next instruction following the branch instruction. For example, a traditional BTAC entry 220 includes a valid branch identifier 220*a*. A valid branch identifier 220*a* indicates whether the branch identifier 220*c* and associated target program counter 220*d* of the traditional BTAC entry 220 include valid data. A valid branch identifier 220*a* may comprise a Boolean value, for example, a single bit wherein a '1' indicates the branch identifier 220*c* and associated target program counter 220*d* are valid and a '0' indicates the branch identifier 220*c* and associated target program counter 220*d* are not valid. The valid branch identifier 220*a* may be asserted (e.g., set to '1') in an instance in which a branch instruction is executed and a valid branch identifier 220*c* and target program counter 220*d* are written to the traditional BTAC entry 220. The valid branch identifier 220*a* may be de-asserted (e.g., set to '0') during initialization, during a BTAC refresh, or any time any portion of data within the traditional BTAC entry 220 is considered invalid or stale.

As further depicted in FIG. 2, the traditional BTAC entry 220 includes a branch taken indicator 220*b*. A branch taken indicator 220*b* is any portion of data indicating a prediction as to whether the target program counter 220*d* indicated by the traditional BTAC entry 220 will be the next instruction executed after the branch instruction. A branch taken indicator 220*b* may comprise a Boolean value, for example, a single bit wherein a '1' indicates the branch is predicted to be taken (e.g., the next instruction will be located at the target program counter 220*d*), and a '0' indicates the branch is predicted to not be taken (e.g., the next instruction will be the next sequential instruction).

A branch taken indicator 220*b* may be determined utilizing branch prediction logic. For example, the fetch unit may include branch prediction logic to predict whether a branch will be taken based on historical data.

As further depicted in FIG. 2, the traditional BTAC entry 220 includes a branch identifier 220*c*. The branch identifier 220*c* is any data, value, or portion of data configured to identify a specific branch instruction. For example, a branch identifier 220*c* may include all, or a portion, of the memory address associated with the branch instruction. In some embodiments, the branch identifier 220*c* may comprise a hash code derived from the branch instruction memory address and/or branch instruction. The branch identifier 220*c* enables a fetch unit to recognize a previously executed branch instruction and provide the target program counter 220*d* of the next instruction in an instance in which the branch prediction logic predicts the branch will be taken.

As further depicted in FIG. 2, the traditional BTAC entry 220 includes a target program counter 220*d*. A target program counter 220*d* is any data, value, or portion of data configured to indicate the memory location of the next instruction to be executed in an instance in which the branch instruction is taken. For example, in a looping code segment the branch instruction may be the last sequential instruction in the looping code segment. In such an instance, the target program counter 220*d* may indicate the memory address of the first instruction in the looping code segment. Thus, in an instance in which the branch instruction is predicted to be taken as indicated by the branch taken indicator 220*b*, the fetch unit may provide the target program counter 220*d* to be the next instruction read by the fetch unit.

FIG. 2 further depicts a branch target address predictor 222. A branch target address predictor 222 is a data construct comprising a plurality of data portions and configured to enable a pipelined architecture to perform consecutive iterations of a looping code segment with zero overhead.

As with a traditional BTAC entry 220, the branch target address predictor 222 includes a valid branch identifier 222*a*, a branch taken indicator 222*b*, and a branch identifier 222*c*. A valid branch identifier 222*a* indicates the validity of the branch target address predictor 222 in the BTAC. A valid branch identifier 222*a* may comprise a Boolean value, for example, a single bit wherein a '1' indicates the data comprising the branch target address predictor 222 is valid and a '0' indicates the data comprising the branch target address predictor 222 is not valid. The valid branch identifier 222*a* may be asserted (e.g., set to '1') in an instance in which a branch instruction is executed and a valid branch identifier 222*c* and target address 222*d* are written to the branch target address predictor 222. The valid branch identifier 222*a* may be de-asserted (e.g., set to '0') during initialization, during a BTAC refresh, or any time any portion of data within the branch target address predictor 222 is considered invalid or stale.

As further depicted in FIG. 2, the branch target address predictor 222 includes a branch taken indicator 222*b*. A branch taken indicator 222*b* is any portion of data indicating a prediction as to whether the target address 222*d* indicated by the branch target address predictor 222 will be the next instruction executed after the branch instruction. A branch taken indicator 222*b* may comprise a Boolean value, for example, a single bit wherein a '1' indicates the branch is predicted to be taken (e.g., the next instruction will be located at the target address 222*d*), and a '0' indicates the branch is predicted to not be taken (e.g., the next instruction will be the next sequential instruction).

A branch taken indicator 222*b* may be determined utilizing branch prediction logic. For example, the fetch unit may include branch prediction logic to predict whether a branch will be taken based on historical data.

As further depicted in FIG. 2, the branch target address predictor 222 includes a branch identifier 222*c*. The branch identifier 222*c* is any data, value, or portion of data configured to identify a specific branch instruction. For example, a branch identifier 222*c* may include all, or a portion, of the memory address associated with the branch instruction. In some embodiments, the branch identifier 222*c* may comprise a hash code derived from the branch instruction memory address and/or branch instruction. The branch identifier 222*c* enables a fetch unit to recognize a previously executed branch instruction and provide the target address 222*d* of the instruction indicated by the target address 222*d* in an instance in which the branch prediction logic predicts the branch will be taken.

As further depicted in FIG. 2, the branch target address predictor 222 includes a target address 222*d*. The target address 222*d* is any data, value, or portion of data configured to indicate the memory location of a future instruction to be executed in an instance in which the branch instruction is taken. The address indicated by the target address 222*d* changes based on the iteration of the looping code segment. After a first iteration of a looping code segment wherein the branch instruction is taken, the target address 222*d* comprises the address of the next instruction if the branch instruction is taken. After subsequent iterations of the looping code segment, the target address 222*d* comprises the address of the second instruction of the looping code segment, sequentially following the first instruction.

For example, in a looping code segment the branch instruction may be the last sequential instruction in the looping code segment. In such an instance, the target address 222*d* may indicate the memory address of the first instruction in the looping code segment after the first iteration of the looping code segment in which the branch instruction is taken. After a second iteration, the target address 222*d* is updated to the memory address of the instruction sequentially following the first instruction (e.g., the second instruction in the looping code segment). The value of the target address 222*d* during iterations of a looping code segment is further described in relation to FIG. 4-FIG. 8.

In an instance in which the branch instruction is predicted to be taken as indicated by the branch taken indicator 222*b*, the fetch unit may provide the target address 222*d* to be the next instruction read by the fetch unit.

As further depicted in FIG. 2, the branch target address predictor 222 includes a target opcode 222*e*. An opcode, or operation code, is any portion of a machine language instruction indicating the operation to be performed during execution. An opcode may be utilized by an execute unit to carry out the instruction. An opcode is configured to comply with the specifications and format of the instruction set architecture, thus, opcodes may vary from system to system. Some non-limiting examples of opcodes may include MOV, POP, PUSH, ADD, JMP, AND, XOR, CALL, CMP, RETN, TEST, branch opcodes such as BEQ, BNE, BGTZ, BLTZ, BGEZ, BLEZ, or any other opcode defined by the instruction set architecture. An opcode may further be associated with one or more operands. The operands may include registers, memory locations, values, and/or other data.

The target opcode 222*e* of the branch target address predictor 222 comprises one or more opcodes comprising a predicted instruction associated with a branch instruction indicated by the branch identifier 222*c*. For example, the target opcode 222*e* may comprise the opcode of the first instruction following the branch instruction in an instance in which the branch instruction is taken and redirects execution to a non-sequential memory location indicated by the branch instruction. By accessing the target opcode 222*e* of the first instruction following the branch instruction in an instance in which the branch instruction is taken, the first instruction may skip the fetch operation performed by the fetch unit of a pipelined architecture. Thus, the first instruction may be executed simultaneously with the branch instruction, in an instance in which the branch instruction condition is met. In addition, the address of the second instruction following the taken branch may be stored in the target address 222*d* of the branch target address predictor 222, enabling the address of the second branch instruction to be fetched immediately following the first instruction. Executing the first instruction following a taken branch, based on the target opcode 222*e*, simultaneous with the execution of the branch instruction may enable a branch operation to be performed with zero overhead.

As further depicted in FIG. 2, the branch target address predictor 222 includes a valid opcode identifier 222*f*. A valid opcode identifier 222*f* indicates the validity of the target opcode 222*e* memory portion in the branch target address predictor 222. A valid opcode identifier 222*f* may comprise a Boolean value, for example, a single bit wherein a '1' indicates the data comprising the target opcode 222*e* is valid and a '0' indicates the data comprising the target opcode 222*e* is not valid. The valid opcode identifier 222*f* may be asserted (e.g., set to '1') in an instance in which the first instruction is executed immediately following the associated branch instruction and the first instruction opcode is stored in the valid opcode identifier 222*f*. The valid opcode identifier 222*f* may be de-asserted (e.g., set to '0') during initialization, during a BTAC refresh, or any time any portion of data within the valid opcode identifier 222*f* is considered invalid or stale.

Figure 3:
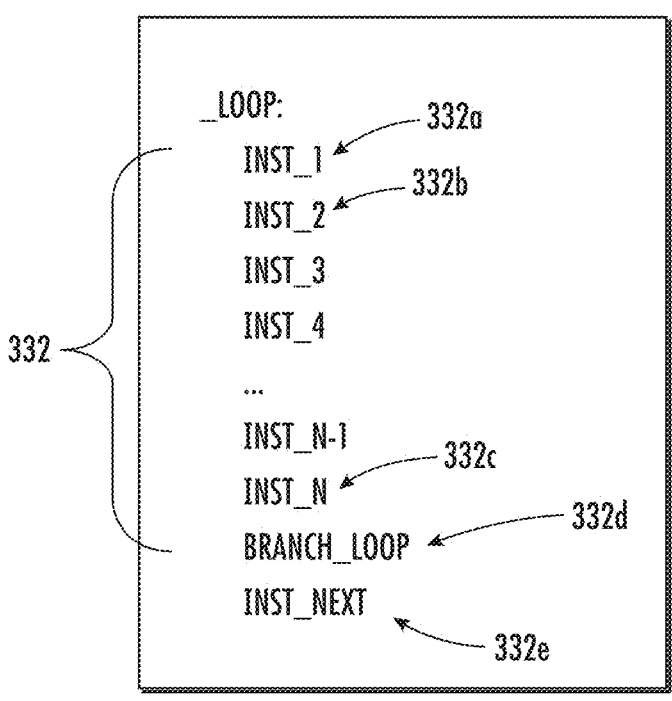
FIG. 3 illustrates a looping code segment in accordance with an example embodiment of the present disclosure.

Referring now to FIG. 3, an example program code segment 330 comprising a looping code segment 332 is provided. As depicted in FIG. 3, the looping code segment 332 includes a plurality of compute instructions, including a first loop instruction 332*a*, a second loop instruction 332*b*, a last loop instruction 332*c*, a loop branch instruction 332*d*, and a next sequential instruction 332*e*.

As depicted in FIG. 3, the example program code segment includes a plurality of compute instructions (e.g., first loop instruction 332*a*, a second loop instruction 332*b*, a last loop instruction 332*c*, a loop branch instruction 332*d*, a next sequential instruction 332*e*). A compute instruction is any program instruction defined in accordance with the specifications and format of the instruction set architecture utilized by a processor executing the compute instructions. In some embodiments, a compute instruction may include an opcode and one or more operands. Further, a compute instruction may be stored at a memory location and accessed by a memory address.

In general, compute instructions of the program code segment 330 are stored in memory at sequential memory locations. Sequential memory locations may not necessarily correspond to sequential address values. For example, the value of sequential memory locations may vary based on the size of the instruction memory. In some embodiments, 0x100, 0x104, 0x108, 0x10C, 0x110, 0x114, and so on, may comprise sequential memory locations.

As depicted in FIG. 3, the program code segment 330 comprises a loop branch instruction 332d. A loop branch instruction 332d is any compute instruction configured to transfer control of the program by placing a non-sequential memory address in the program counter. A loop branch instruction 332d is associated with a target memory location to which the program counter may be set. In some embodiments, a loop branch instruction 332d may be associated with a condition. In an instance in which the condition is met, the branch will be taken, and program execution will continue at the target memory location. In an instance in which the condition is not met, the branch will not be taken, and program execution will continue at the next sequential memory address (e.g., next sequential instruction 332e).

In a pipelined architecture, such as the pipelined architecture depicted in FIG. 1, a branch instruction may have significant effects on performance. In general, in a pipelined architecture, program execution processes the program instructions in lockstep. For example, a pipelined architecture may be many instructions deep. Thus, a processor is configured to fetch and decode many instructions into the future. In an instance in which a branch is taken, the instructions in the pipeline must be flushed and the non-sequential instruction at the branch target memory location is fetched, causing a gap in executed instructions. As described in relation to FIG. 2, a BTAC (e.g., BTAC 102b) may predict whether a branch instruction is taken and populate the pipelined architecture based on the prediction.

As further depicted in FIG. 3, the program code segment includes a looping code segment 332. A looping code segment 332 is any segment of code configured to re-execute based on a condition. For example, a looping code segment 332 may include a count that is incremented during each iteration. The looping code segment 332 may continue to re-execute until the count has reached a certain threshold. Once the threshold has been reached execution will continue at the next sequential instruction 332e.

Looping code segments 332 are a common construct of many computer programs. As depicted in FIG. 3, a loop branch instruction 332d may be placed in memory at the sequential end of the looping code segment 332. Each time the loop branch instruction 332d is executed, the associated condition is checked. If the condition is met, execution returns to the first loop instruction 332a. However, if the condition is not met, execution may continue at the next sequential instruction 332e. The overhead associated with returning to the first loop instruction 332a may include incrementing the instruction counter, fetching and decoding the loop branch instruction 332d, evaluating the loop condition, jumping to the first loop instruction 332a. Such overhead creates a gap between the execution of the last loop instruction 332c and the first loop instruction 332a of the next iteration. Such a gap may adversely affect the performance of the processor. Especially in an instance in which the looping code segment is short and/or repeated frequently.

Figure 4:
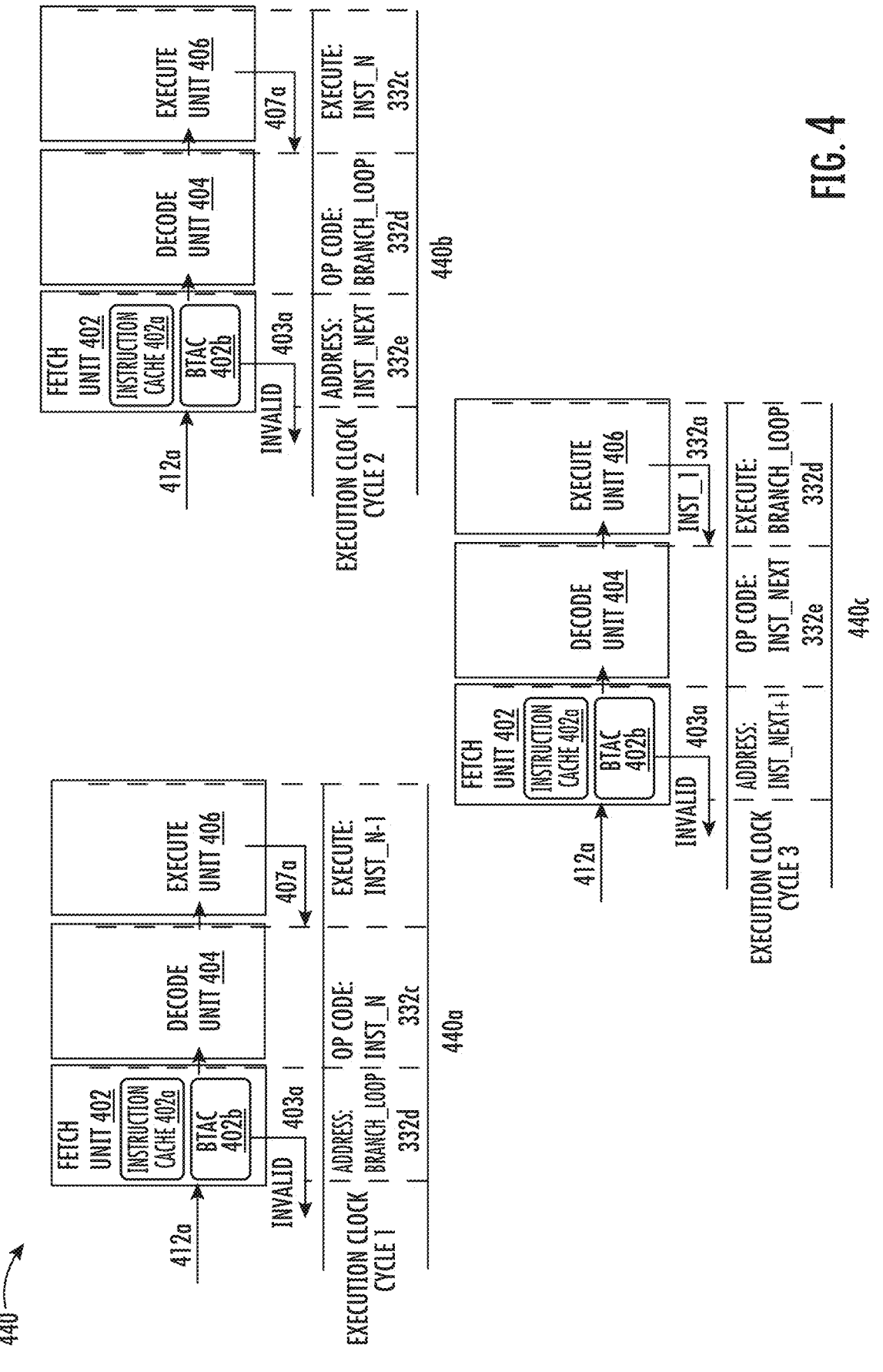
FIG. 4 illustrates a first iteration of the looping code segment within the pipelined architecture of a process in accordance with an example embodiment of the present disclosure.

Referring now to FIG. 4, an example pipeline flow 440 illustrating a first iteration of a looping code segment (e.g., looping code segment 332) is depicted. As depicted in FIG. 4, at step 440a of the pipeline flow 440 (execution clock cycle 1), the address of the loop branch instruction 332d ("Branch_LOOP") is received as the instruction target address 412a at the fetch unit 402. Since this is the first iteration, there is no entry for the loop branch instruction 332d in the BTAC 402b. As such, the predicted branch target address 403a is invalid. As further depicted at step 440a, the last loop instruction 332c is in the decode unit 404 stage of the pipelined architecture.

Step 440b depicts the execution clock cycle 2 of the first iteration of the looping code segment in the pipeline flow 440. As depicted in step 440b, the last loop instruction 332c has moved to the execute unit 406 and the loop branch instruction 332d has moved to the decode unit 404. At execution clock cycle 2, the condition associated with loop branch instruction 332d still has not been resolved, thus, the instruction to follow the loop branch instruction 332d is undetermined. As such, the address of the next sequential instruction 332e is received at the fetch unit 402.

Step 440c depicts the execution clock cycle 3 of the first iteration of the looping code segment in the pipeline flow 440. As depicted in step 440c, the loop branch instruction 332d has moved to the execute unit 406 and the next sequential instruction 332e has moved to the decode unit. At execution clock cycle 3, the condition associated with loop branch instruction 332d is executed. Thus, the instruction to follow the loop branch instruction 332d is determined. As depicted in FIG. 4, the loop branch instruction 332d condition is met and the first loop instruction 332a is returned as the resolved branch target address 407a. Because the next sequential instruction 332e was already in the decode unit 404, the instruction pipeline must be flushed. With the target instruction of the loop branch instruction 332d determined, a branch target address predictor entry in the BTAC may be stored.

Figure 5:
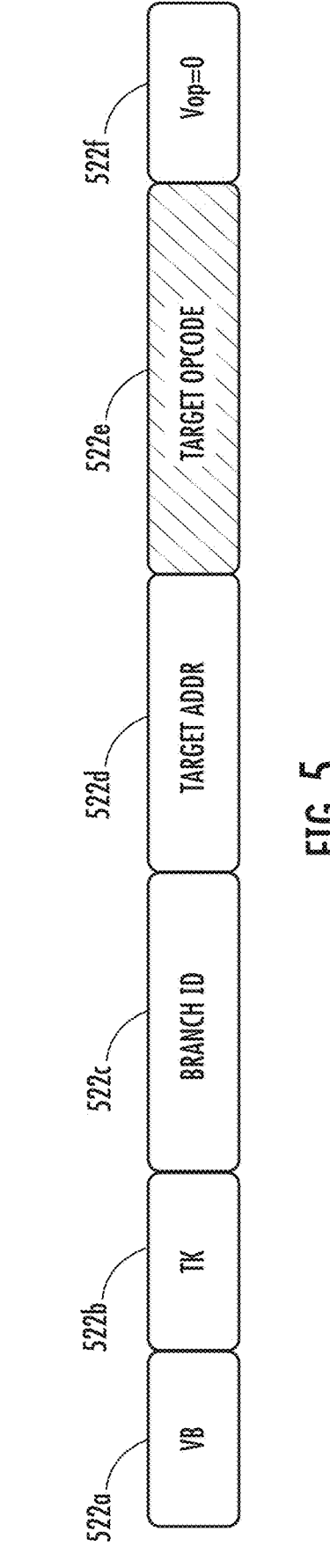
FIG. 5 illustrates an example branch target address predictor after the first iteration of the looping code segment in accordance with an example embodiment of the present disclosure.

Referring now to FIG. 5, the branch target address predictor 522 after a first iteration of the looping code segment 332 is provided. The branch identifier 522c may be populated with an identifier associated with the particular loop branch instruction 332d, such as the memory address of the loop branch instruction 332d. In addition, the target address 522d may be populated with the memory address of the first loop instruction 332a as determined in the execute unit 406 of the loop branch instruction 332d. Further, a branch taken indicator 522b may be populated with a prediction for the next branch, based on branch prediction logic employed by the processor. With the branch identifier 522c and the target address 522d comprising valid values, the valid branch identifier 522a may be asserted, indicating a valid branch identifier 522c and target address 522d. As further depicted in FIG. 5, the target opcode 522e is still invalid and the valid opcode identifier 522f is de-asserted, indicating an invalid target opcode 522e.

Figure 6:
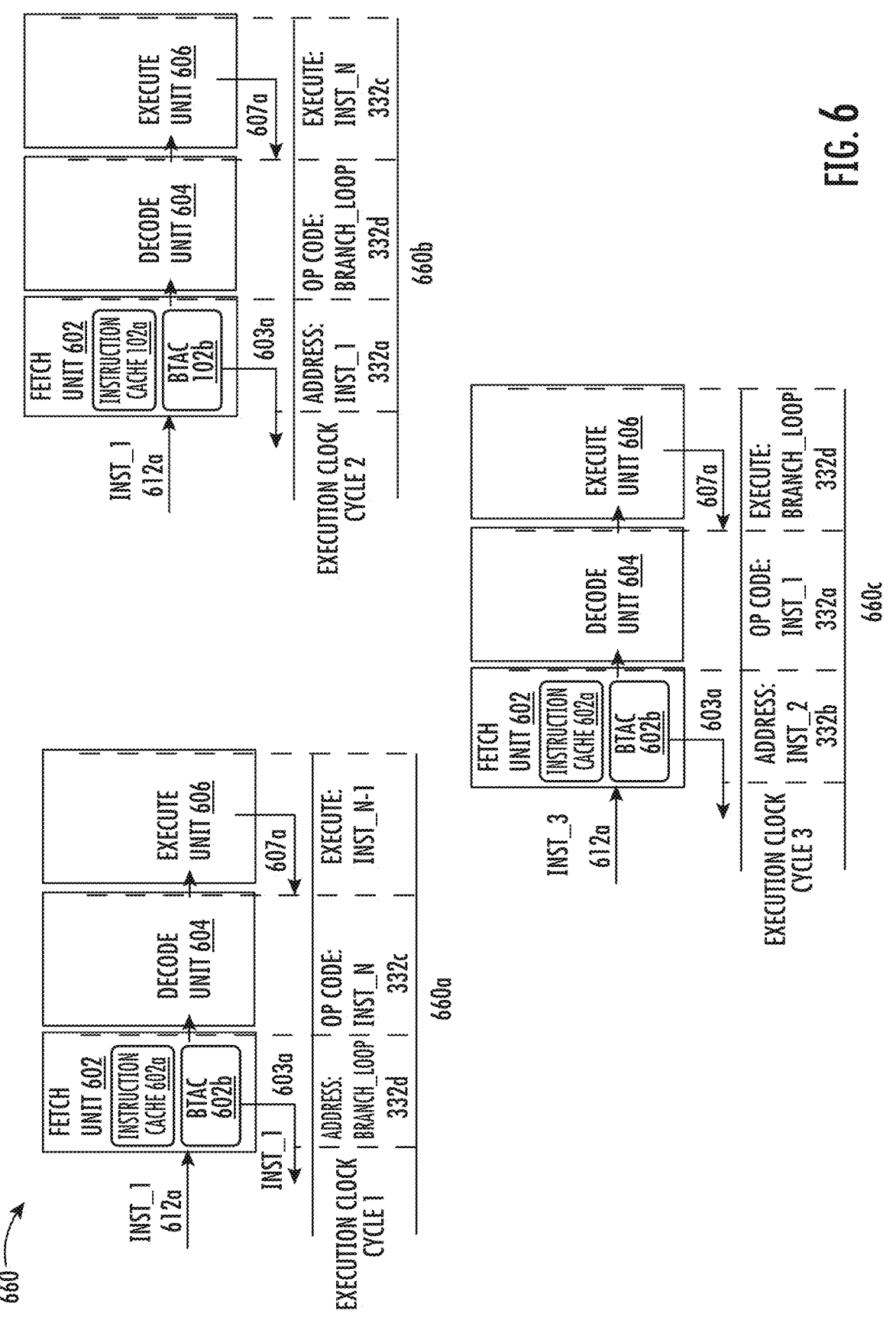
FIG. 6 illustrates a second iteration of the looping code segment within the pipelined architecture of a process in accordance with an example embodiment of the present disclosure.

Referring now to FIG. 6, an example pipeline flow 660 illustrating a second iteration of the looping code segment (e.g., looping code segment 332) is depicted. As depicted in FIG. 6, at step 660a of the pipeline flow 660 (execution clock cycle 1), the address of the loop branch instruction 332d ("Branch_LOOP") is received as the instruction target address 612a at the fetch unit 602. Since the branch identifier and the target address have been previously populated, the valid branch identifier associated with the branch identifier may be asserted and the target address (e.g., memory address of the first loop instruction 332a) associated with the loop branch instruction 332d may be retrieved. As such, in an instance in which the branch is predicted as taken, as shown in FIG. 6, the target address of the first loop instruction 332a may be written as the predicted branch target address 603a and provided to the fetch unit 602 as the instruction target address 612a during execution clock cycle 2.

Step 660b depicts the execution clock cycle 2 of the second iteration of the looping code segment in the pipeline flow 660. As depicted in step 660b, the last loop instruction 332c has moved to the execute unit 606, the loop branch instruction 332d has moved to the decode unit 604, and the address of the first loop instruction 332a is in the program counter read by the fetch unit 602.

Step 660c depicts the execution clock cycle 3 of the second iteration of the looping code segment in the pipeline flow 660. As depicted in step 660c, the loop branch instruction 332d has moved to the execute unit 606, the first loop instruction 332a is decoded at the decode unit 604, and the address of the second loop instruction 332b is loaded into the program counter of the fetch unit 602. At execution clock cycle 3, the opcode associated with the first loop instruction 332a is determined in the decode unit 604. Thus, the target opcode of the branch target address predictor associated with the loop branch instruction 332d may be stored and the valid opcode identifier asserted. Such update may be initiated by the execute unit 606, accessing the target opcode present in the decode unit 604. In addition, the target address may be updated to include the memory address associated with the second loop instruction 332b. An example branch target address predictor after a second iteration of the looping code segment 332 is depicted in FIG. 7.

Figure 7:
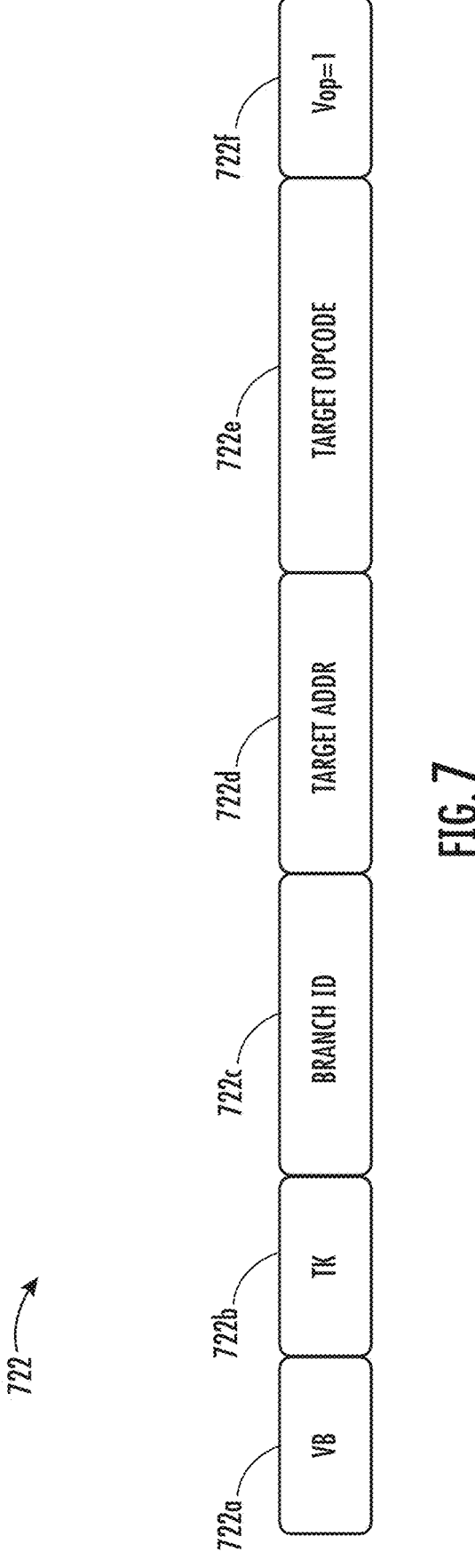
FIG. 7 illustrates an example branch target address predictor after the second iteration of the looping code segment in accordance with an example embodiment of the present disclosure.

Referring now to FIG. 7, the branch target address predictor 722 after a second iteration of the looping code segment 332 is provided. The branch identifier 722c may remain populated with the identifier associated with the particular loop branch instruction 332d, such as the memory address of the loop branch instruction 332d. In addition, the valid branch identifier 722a may remain asserted. The target address 722d is updated to the memory address of the second loop instruction 332b. The opcode associated with the first loop instruction 332a is stored in the target opcode 722e. Further, the valid opcode identifier 722f is asserted to indicate a valid target opcode 222e. By storing the opcode of the first loop instruction 332a and the memory address of the second loop instruction 332b, the looping code segment 332 may be re-executed without any overhead, as depicted in FIG. 8.

Figure 8:
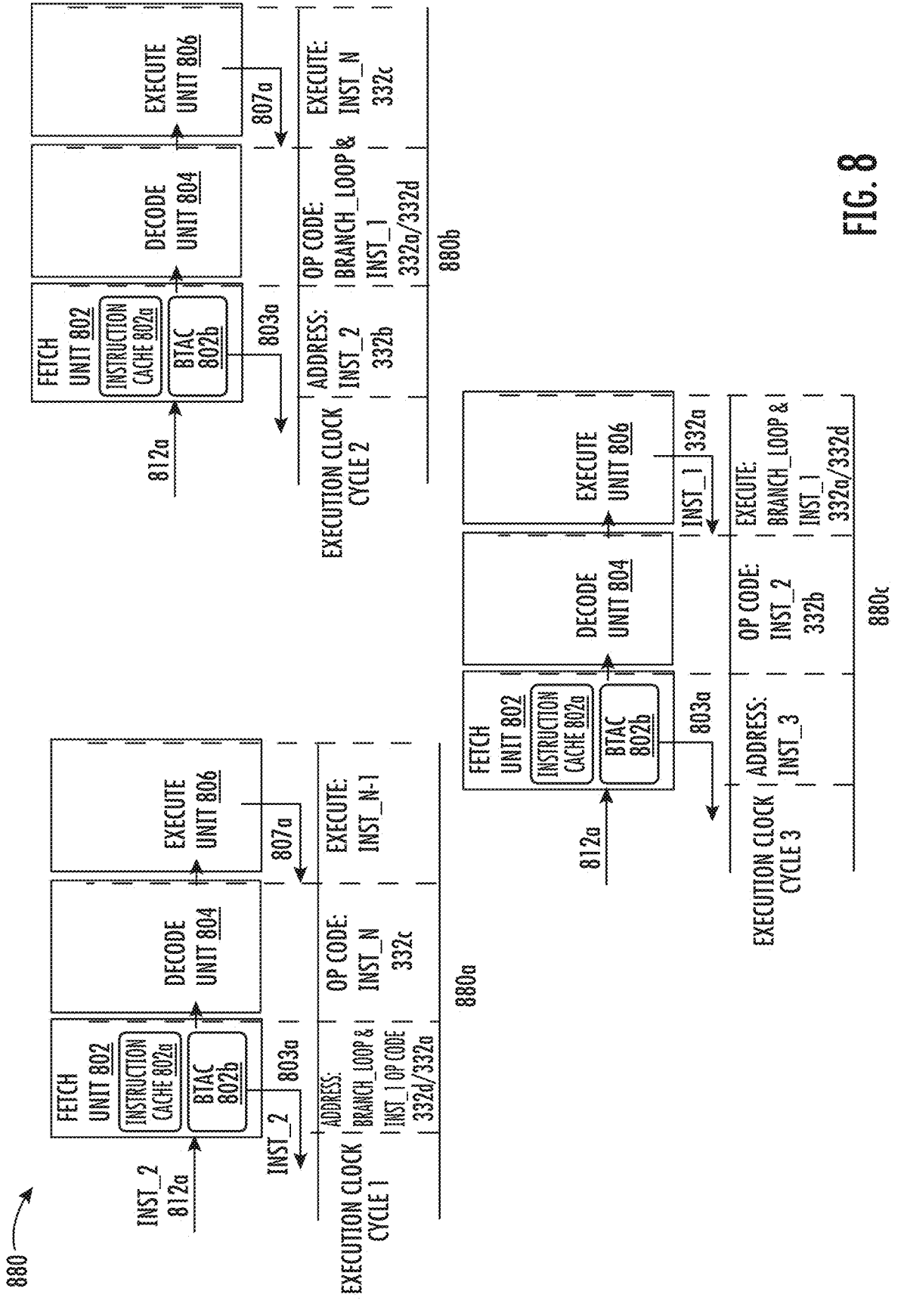
FIG. 8 illustrates a third iteration of the looping code segment within the pipelined architecture of a process in accordance with an example embodiment of the present disclosure.

Referring now to FIG. 8, an example pipeline flow 660 illustrating a subsequent iteration of the looping code segment (e.g., looping code segment 332) is depicted. As depicted in FIG. 8, at step 880a of the pipeline flow 880 (execution clock cycle 1), loop branch instruction 332d is fetched at the fetch unit 802. In addition, since the branch target address predictor associated with the loop branch instruction 332d indicates the target opcode is valid by the valid opcode identifier, the opcode for the first loop instruction 332a may be accessed. Accessing the first loop instruction 332a opcode stored in the target opcode enables the first loop instruction 332a to skip the fetch unit 802. Thus, the first loop instruction 332a may be executed during the same execution clock cycle (e.g., execution clock cycle 3) the branch condition associated with the loop branch instruction 332d is resolved.

During step 880a, the target address associated with the loop branch instruction 332d may also be retrieved. The target address comprises the memory address of the second loop instruction 332b. As such, in an instance in which the branch is predicted as taken, as shown in FIG. 8, the target address comprising the memory address of the second loop instruction 332b may be written as the predicted branch target address 803a and provided to the fetch unit 802 as the instruction target address 812a during execution clock cycle 2.

Step 880b depicts the execution clock cycle 2 of the subsequent iteration of the looping code segment in the pipeline flow 880. As depicted in step 880b, the last loop instruction 332c has moved to the execute unit 806, the loop branch instruction 332d and the opcode of the first loop instruction 332a are in the decode unit 804, and the memory address of the second loop instruction 332b is in the program counter of the fetch unit 802.

Step 880c depicts the execution clock cycle 3 of the subsequent iteration of the looping code segment in the pipeline flow 880. As depicted in step 880c, the loop branch instruction 332d and the first loop instruction 332a are executed simultaneously in the execute unit 606 in an instance in which the condition associated with the loop branch instruction 332d resolves as taken. The second loop instruction 332b is decoded at the decode unit 604, and the address of the third loop instruction is loaded into the program counter of the fetch unit 602. As depicted in FIG. 8, in all subsequent re-executions of the looping code segment, the first loop instruction 332a is performed in the execution clock cycle immediately following the last loop instruction 332c. Thus, subsequent iterations of the looping code segment 332 are performed with zero overhead.

Referring now to FIG. 9, an example process 900 for executing a looping code segment (e.g., looping code segment 332) with zero overhead is provided. At block 902, the processor executes a loop branch instruction (e.g., loop branch instruction 332d) of the looping code segment, the looping code segment comprising a first loop instruction (e.g., first loop instruction 332a) at a first loop instruction address and a last loop instruction (e.g., last loop instruction 332c) at a last loop instruction address, wherein the loop branch instruction directs execution to the first loop instruction address upon satisfaction of a branch condition, and wherein the first loop instruction address is not sequential to an address of the loop branch instruction. As described herein, a loop branch instruction of a looping code segment may direct execution to a non-sequential memory address, such as the memory address of the first loop instruction of a looping code segment. The loop branch instruction may be configured to direct execution to the non-sequential memory address based on a satisfied condition.

At block 904, the processor stores a branch identifier (e.g., branch identifier 222c, 522c, 722c) associated with the loop branch instruction in a branch target address predictor (e.g., branch target address predictor 222, 522, 722). As described herein, the branch identifier may be any value configured to identify the loop branch instruction, for example, a portion of the memory address associated with the loop branch instruction, a hash code derived from the loop branch instruction and/or the loop branch opcode, and/or any combination thereof.

At block 906, the processor stores a first loop instruction associated with the first loop instruction address in the branch target address predictor. The processor is further configured to determine and store a first loop instruction in a branch target address predictor identified by the branch identifier. The first loop instruction may comprise an opcode or other data construct configured to facilitate the execution of the first loop instruction without fetching the opcode at the first loop instruction address. Storing the first loop instruction enables a pipelined architecture to execute the condition associated with the loop branch instruction and the first loop instruction in the same execute clock cycle, in an instance in which the condition is met. In some embodiments, the first loop instruction is stored to the target opcode (e.g., target opcode 222e, 522e, 722e) of the branch target address predictor after the second iteration of the looping code segment.

At block 908, the processor stores a second loop instruction address in the branch target address predictor, wherein the second loop instruction address is in sequence with the first loop instruction address. A processor may be configured to determine the next instruction in the looping code sequence after the first loop instruction (e.g., second loop instruction 332b). The second loop address may be stored in the branch target address predictor identified by the branch identifier. Storing the address of the second loop instruction, enables the second loop instruction to directly follow the loop branch instruction and the first loop instruction in the pipelined architecture.

At block 910, the processor executes at least one iteration of the looping code segment with zero overhead, in an instance in which the branch condition is met, wherein executing the looping code segment with zero overhead comprises executing the first loop instruction during an executing clock cycle immediately following execution of the last loop instruction. By storing the instruction opcode of the first loop instruction, the first loop instruction may execute during the same execution clock cycle as the loop branch instruction, immediately following the last loop instruction (e.g., last loop instruction 332c). Further, by storing the memory address of the second loop instruction, the second loop instruction may execute during the execution clock cycle immediately following the first loop instruction. Thus, the last loop instruction, the first loop instruction, and the second loop instruction may all execute in consecutive execution clock cycles, eliminating all overhead in an instance in which the branch condition is met.

Referring now to FIG. 10, an example process 1000 utilizing a pipelined architecture for executing a looping code segment (e.g., looping code segment 332) with zero overhead is provided. At block 1002, the processor fetches, by a fetch unit (e.g., fetch unit 102, 402, 602, 802) of a pipelined instruction set architecture (e.g., pipelined architecture 100), an address of a first executing instruction. A first execution instruction may be any compute instruction (e.g., first loop instruction 332a, second loop instruction 332b, last loop instruction 332c, loop branch instruction 332d, next sequential instruction 332e, etc.). The fetch unit is configured to load the address of the first executing instruction into the program counter. In some embodiments, the address of the first executing instruction may be the memory address in next sequence. In some embodiments, the address of the first executing instruction may be a non-sequential memory address, for example the target address of a branch instruction.

At block 1004, the processor decodes, by a decode unit (e.g., decode unit 104, 404, 604, 804) of the pipelined instruction set architecture, one or more operational codes associated with the first executing instruction. The operational codes may be any data constructs in accordance with the specifications and format of the instruction set architecture utilized by a processor executing the compute instructions. The operation code provides all information necessary to execute the first executing instruction during the execute stage.

At block 1006, the processor executes, by an execute unit (e.g., execute unit 106, 406, 606, 806), configured to execute the one or more operational codes associated with the first executing instruction. The execute unit performs all tasks related to the instruction decoded by the decode unit. For example, the execute unit may read one or more registers, transmit data to one or more arithmetic units, write values to a location or register, and so on.

While this detailed description has set forth some embodiments of the present invention, the appended claims cover other embodiments of the present invention which differ from the described embodiments according to various modifications and improvements. For example, one skilled in the art may recognize that such principles may be applied to any processor configured to execute looping code segments in a pipelined architecture. For example, a digital signal processor may greatly benefit from the improvements in performance made possible by the embodiments described herein.

Within the appended claims, unless the specific term "means for" or "step for" is used within a given claim, it is not intended that the claim be interpreted under 35 U.S.C. 112, paragraph 6.

Use of broader terms such as "comprises," "includes," and "having" should be understood to provide support for narrower terms such as "consisting of," "consisting essentially of," and "comprised substantially of" Use of the terms "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

The invention claimed is:

1. A processor, comprising:
a pipelined architecture configured to execute one or more instructions on an execute clock cycle;
a looping code segment comprising a first loop instruction at a first loop instruction address, a last loop instruction at a last loop instruction address, and a loop branch instruction; and
a branch target address predictor, comprising:
a branch identifier configured to identify the loop branch instruction;
one or more first instruction operational codes associated with the first loop instruction;
a second loop instruction address, wherein the second loop instruction address is in sequence with the first loop instruction address; and
a branch taken indicator indicating a likelihood that the loop branch instruction directs execution to the first loop instruction,
wherein the branch target address predictor enables the pipelined architecture to execute the last loop instruction and the first loop instruction on consecutive execute clock cycles.

2. The processor of claim 1, the branch target address predictor further comprising:
a valid branch identifier, indicating the branch identifier is initialized.

3. The processor of claim 2, the branch target address predictor further comprising:
a valid opcode identifier, indicating the one or more first instruction operational codes associated with the first loop instruction are initialized.

4. The processor of claim 3, further comprising a branch target address cache, the branch target address cache comprising one or more branch target address predictors.

5. The processor of claim 4, wherein the loop branch instruction associated with the branch identifier is executed as part of the looping code segment, wherein the loop branch instruction is executed last in the looping code segment.

6. The processor of claim 5, wherein a branch target address predictor is stored in the branch target address cache after a first execution of the loop branch instruction, and wherein the branch identifier of the branch target address predictor is associated with an instruction address of the loop branch instruction.

7. The processor of claim 6, wherein the valid branch identifier is updated to indicate the branch identifier is initialized.

8. The processor of claim 6, wherein the second loop instruction address is stored in the branch target address predictor after a second execution of the loop branch instruction.

9. The processor of claim 8, wherein the valid opcode identifier is updated to indicate the second loop instruction address is initialized.

10. The processor of claim 5, the pipelined architecture further comprising:
   a fetch unit, configured to identify an address of a first executing instruction;
   a decode unit, configured to determine one or more operational codes associated with the first executing instruction; and
   an execute unit, configured to execute the one or more operational codes associated with the first executing instruction.

11. The processor of claim 10, wherein the first executing instruction in the pipelined architecture comprises the loop branch instruction and the one or more first instruction operational codes associated with the first loop instruction.

12. A method for executing a looping code segment, the method comprising:
   executing a loop branch instruction of the looping code segment, the looping code segment comprising a first loop instruction at a first loop instruction address and a last loop instruction at a last loop instruction address,
      wherein the loop branch instruction directs execution to the first loop instruction address upon satisfaction of a branch condition, and
      wherein the first loop instruction address is not sequential to an address of the loop branch instruction;
   storing a branch identifier associated with the loop branch instruction in a branch target address predictor;
   storing a first loop instruction associated with the first loop instruction address in the branch target address predictor;
   storing a second loop instruction address in the branch target address predictor,
      wherein the second loop instruction address is in sequence with the first loop instruction address; and
   executing at least one iteration of the looping code segment with zero overhead, in an instance in which the branch condition is met,
      wherein executing the looping code segment with zero overhead comprises executing the first loop instruction during an execution clock cycle immediately following execution of the last loop instruction.

13. The method of claim 12, further comprising:
   storing a valid branch identifier, indicating the branch identifier is initialized.

14. The method of claim 12, further comprising:
   storing a valid opcode identifier, indicating the second loop instruction address is initialized.

15. The method of claim 12, further comprises:
   storing one or more branch target address predictors in a branch target address cache.

16. The method of claim 12, further comprising:
   fetching, by a fetch unit of a pipelined architecture, an address of a first executing instruction;
   decoding, by a decode unit of the pipelined architecture, one or more operational codes associated with the first executing instruction; and
   executing, by an execute unit of the pipelined architecture, the one or more operational codes associated with the first executing instruction.

17. The method of claim 16, wherein the first executing instruction in the pipelined architecture comprises the loop branch instruction and the one or more operational codes associated with the first executing instruction.

18. A processor comprising:
   a pipelined architecture configured to execute one or more instructions on an execute clock cycle;
   a looping code segment comprising a first loop instruction at a first loop instruction address, a second loop instruction at a second loop instruction address, a last loop instruction at a last loop instruction address, and a loop branch instruction; and
   a branch target address predictor, comprising:
      a first memory portion configured to store a valid branch identifier, indicating a branch identifier is initialized;
      a second memory portion configured to store a branch taken indicator indicating a likelihood that the loop branch instruction directs execution to the first loop instruction;
      a third memory portion configured to store the branch identifier;
      a fourth memory portion configured to store a variable target address instruction,
         wherein the fourth memory portion stores the first loop instruction address after a first iteration of the looping code segment, and
         wherein the fourth memory portion stores the second loop instruction address after two or more iterations of the looping code segment;
      a fifth memory portion configured to store one or more first instruction operational codes associated with the first loop instruction; and
      a sixth memory portion configured to store a valid opcode identifier, indicating the one or more first instruction operational codes stored in the fifth memory portion are initialized,
   wherein the branch target address predictor enables the pipelined architecture to execute the last loop instruction and the first loop instruction on consecutive execute clock cycles.

19. The processor of claim 18, the pipelined architecture further comprising:
   a fetch unit, configured to identify an address of a first executing instruction;
   a decode unit, configured to determine one or more operational codes associated with the first executing instruction; and
   an execute unit, configured to execute the one or more operational codes associated with the first executing instruction.

20. The processor of claim 19, wherein the first executing instruction in the pipelined architecture comprises the loop branch instruction and the first loop instruction.

\* \* \* \* \*